United States Patent
Harbottle et al.

(12)
(10) Patent No.: US 6,505,972 B1
(45) Date of Patent: Jan. 14, 2003

(54) BEARING WITH ADJUSTABLE SETTING

(75) Inventors: William E. Harbottle, Ft. Lauderdale, FL (US); Tadao Tsuneyoshi, Stark County, OH (US)

(73) Assignee: The Timken Company, Canton, OH (US)

( * ) Notice: Subject to any disclaimer, the term of this patent is extended or adjusted under 35 U.S.C. 154(b) by 4 days.

(21) Appl. No.: 09/653,590

(22) Filed: Sep. 1, 2000

(51) Int. Cl.⁷ .............................................. F16C 19/28
(52) U.S. Cl. ....................................... 384/517
(58) Field of Search ................. 384/517, 563, 384/519, 583, 445, 537

(56) References Cited

U.S. PATENT DOCUMENTS

| 3,664,718 A | 5/1972 | Uhtenwoldt |
| 3,716,280 A | 2/1973 | Leibensperger et al. |
| 5,388,917 A | 2/1995 | Hibi et al. |

FOREIGN PATENT DOCUMENTS

| DE | 1292452 | 4/1969 |
| GB | 1604879 | 12/1981 |
| JP | 724603 | 1/1995 |
| JP | 8174306 | 7/1996 |

OTHER PUBLICATIONS

NTN Publication (No date).

*Primary Examiner*—Lenard A. Footland
(74) *Attorney, Agent, or Firm*—Polster, Lieder, Woodruff and Lucchesi, L.C.

(57) ABSTRACT

A spindle rotates within a housing on at least two antifriction bearings which have raceways that are inclined to the axis of the bearing and are otherwise configured to transfer thrust loading as well as radial loading. The bearings are mounted in opposition. One of the bearings has a race which fits into an actuator sleeve with an interference fit, and the actuator sleeve, in turn, is fitted into the housing, it having end regions that are located beyond the ends of the bearing. Here the sleeve is fitted to the housing with an interference fit and is further sealed to the housing. The actuator sleeve also has an intervening region between its two end regions, and here the actuator sleeve is located around the race. On its opposite face the actuator sleeve forms a chamber with the housing. When the chamber is pressurized, the intervening region of the sleeve flexes inwardly and contracts the race, thus altering the setting of the two bearings. Yet the end regions of the sleeve remain against the housing and the axis of rotation remains rigid. A control system monitors conditions, such as temperature, within the housing, and varies the pressure in the chamber behind the actuator sleeve, so that the setting in the bearings best accommodates the conditions under which the spindle operates.

16 Claims, 5 Drawing Sheets

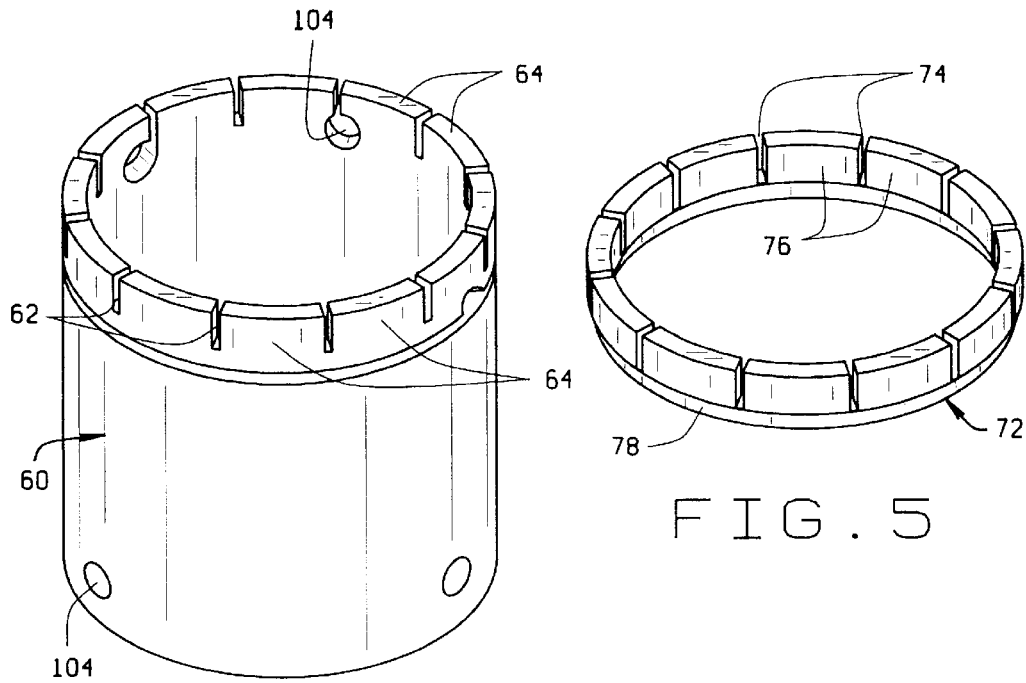
FIG. 4
FIG. 5
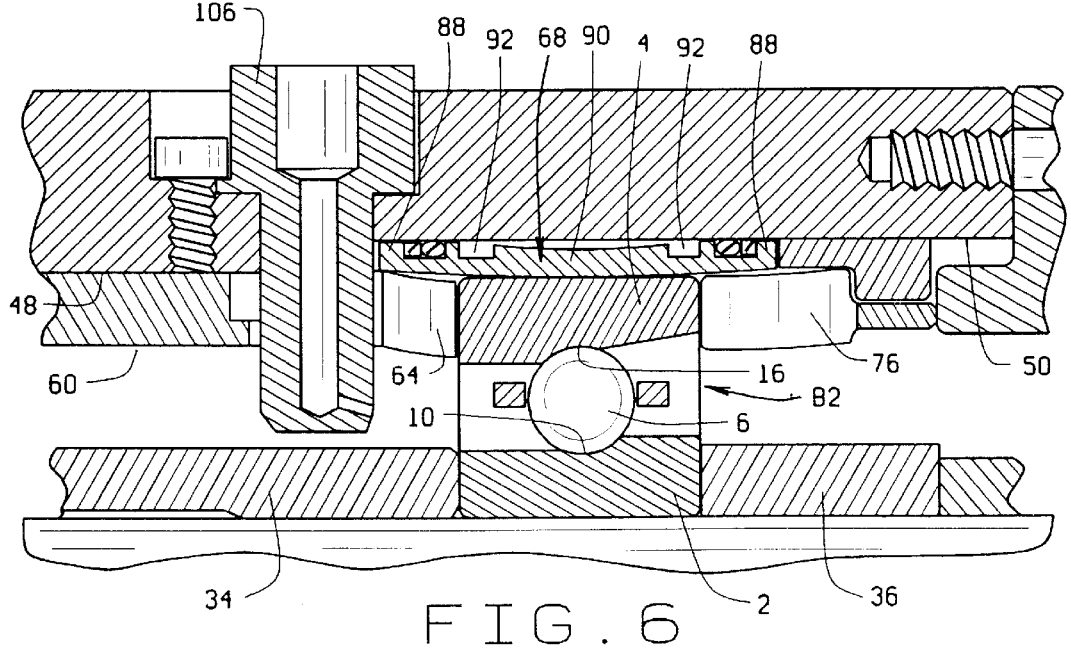
FIG. 6

BEARING WITH ADJUSTABLE SETTING

CROSS-REFERENCE TO RELATED APPLICATIONS

None.

STATEMENT REGARDING FEDERALLY SPONSORED RESEARCH OR DEVELOPMENT.

Not Applicable.

BACKGROUND OF THE INVENTION

This invention relates in general to antifriction bearings and, more particularly, to a bearing mounting in which the setting of a bearing may be altered during the operation of the bearing.

Machine tool spindles must operate with full rigidity—rigidity in the sense that the axis of rotation for the spindle remains precisely fixed with respect to the housing in which the spindle rotates. A variety of bearing arrangements exist for supporting machine tool spindles in housings, and each employs several antifriction bearings of one type or another. The typical antifriction bearing, irrespective of its type, has an outer race located within the housing, an inner race fitted around the spindle, and rolling elements located between raceways on the two races. In order to achieve spindle rigidity, no clearance should exist between the outer race and the housing, nor should any clearance exist between the inner race and the spindle. Furthermore, the bearing should operate without internal clearances between the rolling elements and the raceways. In short, the bearing should operate under a preload. Usually, preloaded bearings operate in pairs or other multiple arrangements, so that one of the bearings may be adjusted against another of the bearings.

For example, a spindle may be supported on two single row tapered roller bearings mounted in opposition. Both carry radial loads, while one takes thrust loading in one direction and the other takes thrust loads in the opposite direction. Usually, one of the inner races, typically called a cone, is advanced axially toward the other until the bearings are in preload. This type of mounting arrangement will transfer heavy radial and thrust loads, but the spindle can operate only a moderate speeds. Angular contact ball bearings, like tapered roller bearings, have the capacity to carry both radial and thrust loads, and while they can tolerate higher speeds, they do not have the load-carrying capacity of tapered roller bearings. For this reason many high speed spindles rotate on multiple angular contact ball bearings, some oriented to take thrust loads directed inwardly from the nose and the remainder oriented to take thrust loads in the opposite direction. The presence of multiple bearings in the mounting renders the procedure for setting the bearings extremely tedious and difficult.

Even when a machine tool mounting is assembled with the correct amount of preload in its spindle bearings, this provides no assurance that the preload will remain or that it will not change. In operation, the bearings generate heat, and this heat will cause the spindle and the housing to expand at different rates. This in turn disturbs and indeed changes the setting in the bearings. An increase in preload may damage the bearings, whereas a decrease may eliminate the preload altogether and produce internal clearances. Neither is desirable in a machine tool.

Apart from that, machine tool spindles—or for that matter any rotating component—should not operate at or near its resonant frequency. But machining operations will set up self-excited vibrations which in their more violent form are referred to as chatter. To avoid chatter machine tool operators can alter the spindle speed, feed rate or depth of cut—and sometimes these conditions need to be altered a considerable amount to the detriment of the machining operations.

To be sure, efforts have been undertaken to avoid the forgoing problems with specialized bearings. For example, The Timken Company developed a spindle bearing arrangement which relies on two tapered roller bearings mounted in opposition (FIG. 1A). One of the bearings is essentially a single row tapered roller bearing. The other has a floating rib ring which is backed by a hydraulic fluid and positions the rollers axially between the two raceways for the bearing. The pressure of the fluid determines the preload in the bearings and the stiffness in the spindle. It further provides automatic compensation for thermal expansion and contraction since a uniform pressure in the fluid behind the rib ring will yield a constant preload irrespective of the axial position of the two raceways. Also, the operator, by controlling the stiffness of the spindle, can vary the resonant frequency of the spindle and thus avoid chatter. However, the bearing arrangement still relies on tapered roller bearings and is thus confined to moderate spindle speeds. Moreover, the two bearings can only operate under preload which is desirable for machine tool spindles, but perhaps not for other applications. U.S. Pat. No. 3,716,280 discloses the bearing arrangement.

Another specialized bearing arrangement for machine tool spindles utilizes a combination of cylindrical roller bearings and angular ball bearings (FIG. 1B). The former carry most of the radial loading, while the latter transmit the lesser thrust loads. But cylindrical roller bearings inherently have internal clearances, for without internal clearances such bearing could not be assembled. To eliminate the clearances, the inner races of the cylindrical roller bearings have tapered bores and at those bores fit over tapered surfaces on the spindle. When the inner races are forced axially over the tapers on the spindle, the tapers on the spindle expand the inner races and thus eliminate clearances between the cylindrical rollers and the raceways. But to achieve the correct setting, stops are needed to axially locate the inner races on the spindle, and they must be positioned with considerable precision. As a practical matter, this requires multiple assembly attempts and grinds along the stops or the bearing faces until the bearings acquire the proper preload.

Ideally, the bearings which support a machine tool spindle in a housing should be capable of undergoing adjustment during the operation of the bearing so as to operate continuously at a prescribed preload, this irrespective of temperature variations in the spindle the housing and the bearings themselves. The capacity to adjust preload also enables the bearings to alter the resonant frequency of the spindle, and thus easily compensate for chatter. What has been said with regard to machine tool spindles applies as well to some other applications where one component rotates relative to another on antifriction. Indeed, in some applications it is desirable to have end play and thus have the capacity to adjust between end play and preload.

SUMMARY OF THE INVENTION

The present invention resides in a mounting that includes two members, one of which rotates relative to the other on a bearing that includes a raceway carried by one of the members, another raceway on a race carried by the other member, and rolling elements arranged in a row between the two raceways. The member which carries the race has an actuator sleeve which at its ends is fitted tightly to the member but has an intervening region which flexes. The sleeve together with the member to which it is fitted define a chamber. The intervening region of the sleeve fits behind the bearing race. When the chamber is pressurized, the intervening region of the sleeve flexes and changes the configuration of the race against which it bears. This, in turn, changes the setting of the bearing.

DESCRIPTION OF THE DRAWINGS

FIG. 4 is a perspective view of a spacer sleeve forming part of the present invention;

FIG. 5 is a perspective view of a clamping sleeve forming part of the present invention;

FIG. 6 is a fragmentary sectional view similar to FIG. 3, but showing the actuator sleeve subjected to an elevated pressure that flexes the sleeve inwardly with the flexure being exaggerated for purposes of illustration;

DETAILED DESCRIPTION

Figure 1A:
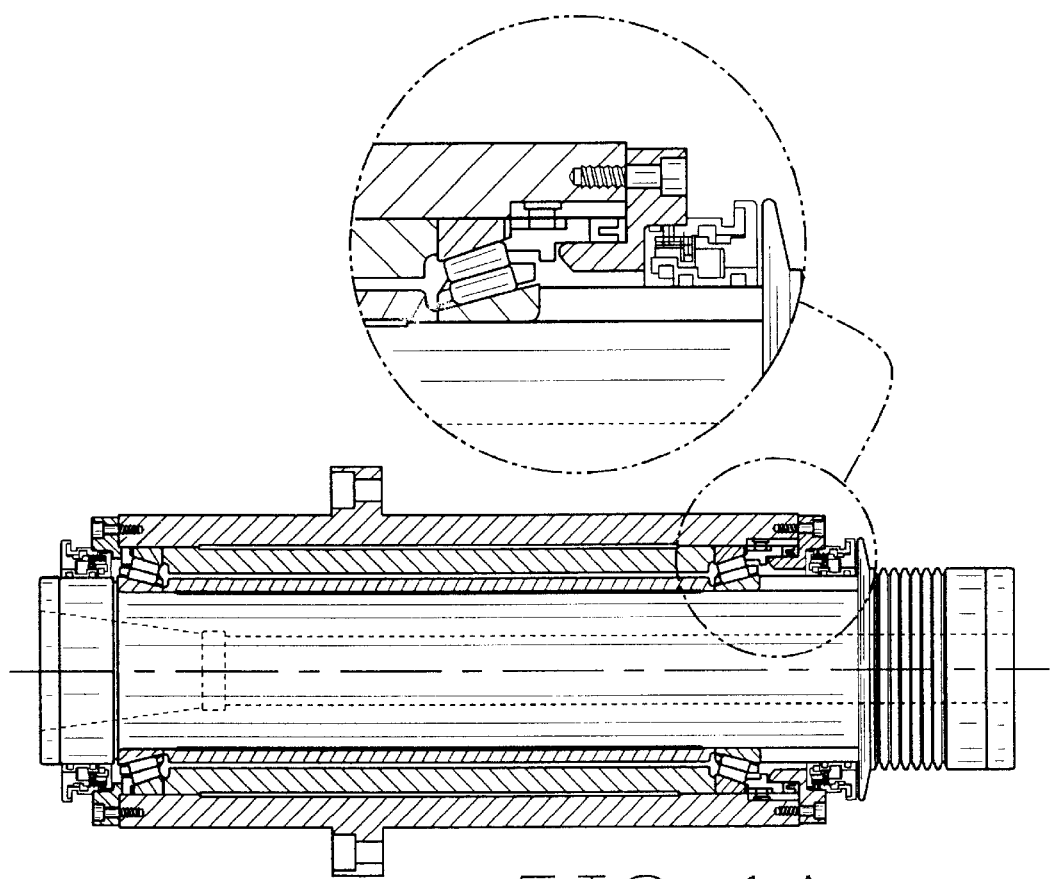
FIG. 1A and 1B are longitudinal sectional views of prior art spindle mountings.
Figure 1B:
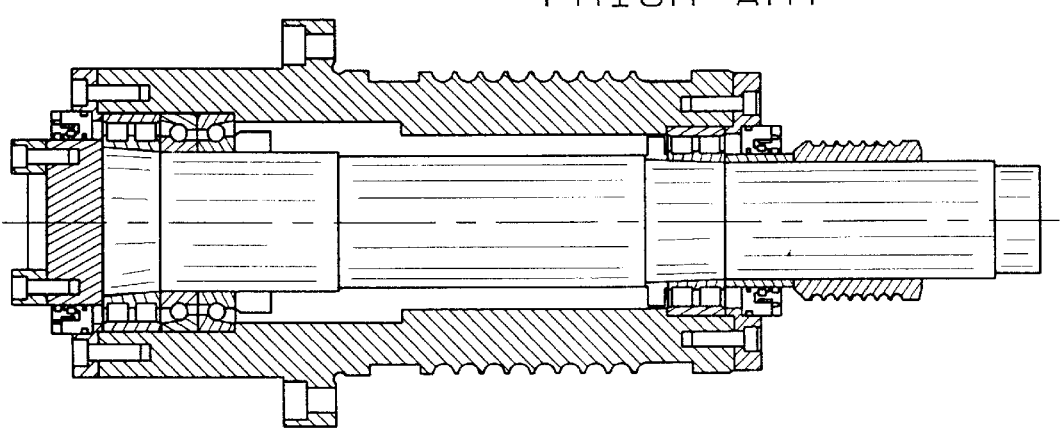

Referring now to the drawings (FIG. 2), a spindle S rotates about an axis X in a housing H on two antifriction bearings B1 and B2, which take the form of single row angular contact ball bearings. The spindle S, housing H and bearings B together form a bearing assembly or mounting M having a nose position N and a tail position T. The bearing B1 operates at the nose position N where it is closest to the workpiece being machined, while the bearing B2 operates at the tail position T. Each bearing B1 and B2 fits around the spindle S and within the housing H and, being a single row angular contact ball bearing, has the capacity to transfer radial loading as well as thrust loading in one axial direction. The two bearings B1 and B2 are mounted in opposition, so that the bearing B1 takes thrust loading directed axially toward the nose end of the housing H and the other bearing B2 takes thrust loading in the opposite direction. Moreover, the two bearings B1 and B2 are adjusted to a condition of preload, so that the axis X remains fixed—or perfectly rigid—with respect to the housing H.

Considering the bearings B first, the bearing B1 fits between the spindle S and housing H at the nose position N and the other bearing B2 fits between the spindle S and the housing H at the tail position T. Each bearing B includes (FIG. 2) an inner race 2, an outer race 4 which surrounds the inner race 2, yet is spaced from it, and rolling elements in the form of balls 6 arranged in a single row between the inner race 2 and outer race 4. In addition, each bearing B has a cage 8 provided with pockets which receive the balls 6, so that the cage 8 maintains the proper spacing between the balls 6. The two races 2 and 4 are arranged concentric to each other, with their common center being the axis X.

Figure 2:
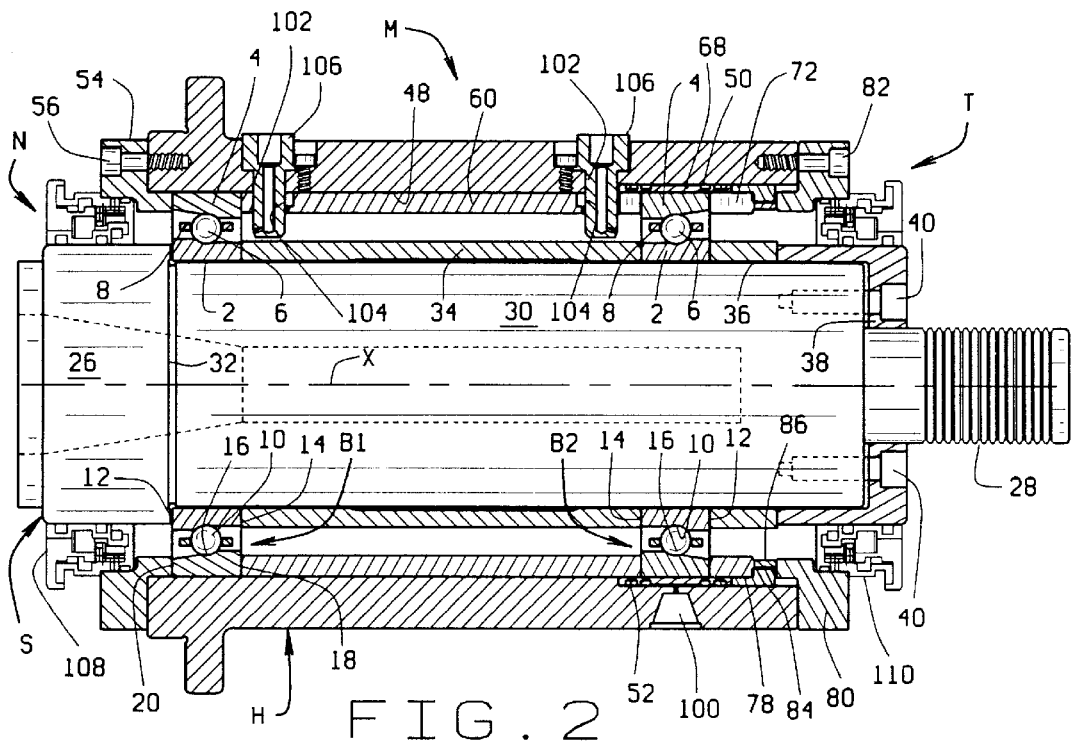
FIG. 2 is a longitudinal sectional view of a mounting constructed in accordance with and embodying the present invention.
Figure 3:
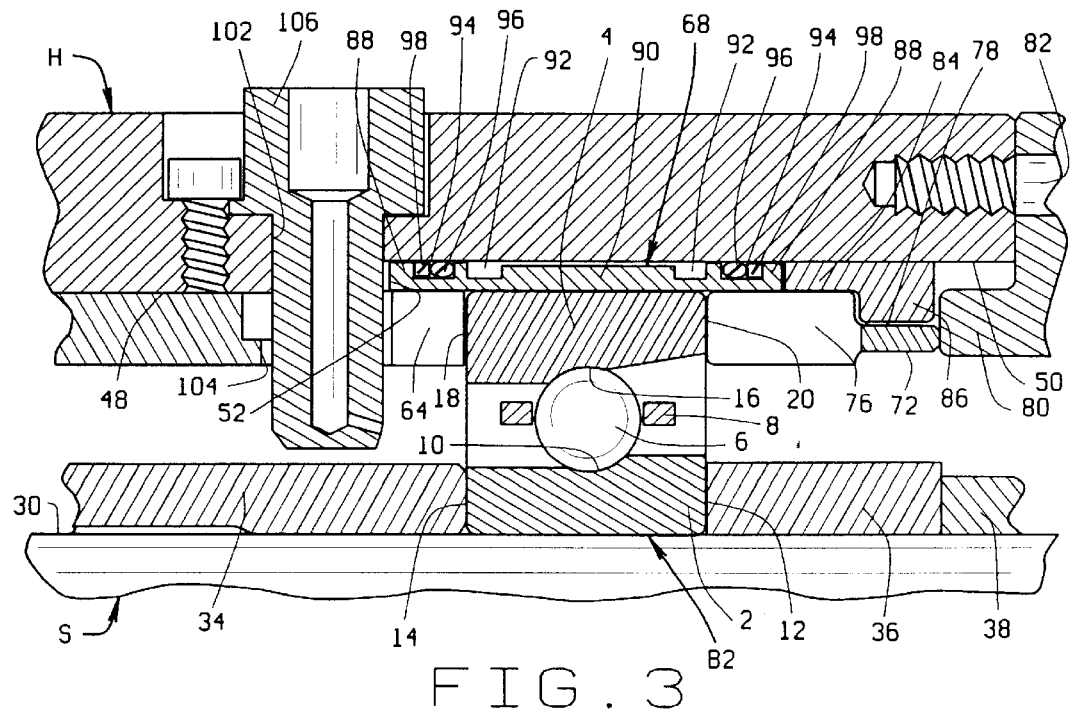
FIG. 3 is a fragmentary sectional view, enlarged, of the mounting of the present invention, when its actuator sleeve is not subjected to elevated pressures.

The inner race 2 fits over the spindle S and has a raceway 10 that is presented outwardly away from the axis X. The raceway 10 lies between two end faces which are squared off with respect to the axis X, the one being a back face 12 through which thrust loading is transferred and the other being a front face 14 (FIGS. 2 & 3). The outer race 4 fits into the housing H and has a raceway 16 which is presented inwardly toward the raceway 10 of the inner race 2. The raceway 16 likewise lies between two end faces which are squared off with respect to the axis X, one being a back face 18 and the other being a front face 20. The back faces 12 and 18 of the races 2 and 4 are presented away from each other. The two raceways 10 and 16 are arcuate on cross-section and generally conform to the contour of the balls 6. The raceway 10 of the inner race 2 is higher toward the back face 12 than toward the front face 14, thus giving the back face 12 a greater surface area. Likewise, the raceway 16 of the outer race 4 possesses its greatest height on the side toward the back face 18 and a lesser height on the side toward the front face 20, so the back face 18 has a greater surface area than the front face 20. The variance in the height inclines the raceways 10 and 16, that is to say, it orients them obliquely with respect to the axis X, and as a consequence, the bearing B will transfer not only radial loads, but also thrust loads when the thrust loads are transmitted through the back faces 12 and 18. Indeed, a thrust load so transmitted will cause the balls 6 to seat against the raceways 10 and 16 so that no clearance exists between any of the balls 6 and the raceways 10 and 16. When a thrust load exists in both bearing B1 and B2 in the absence of any external load, the bearings B are set to a condition of preload.

The spindle S extends completely through the housing H (FIG. 2). At its nose position N it has a large diameter cylindrical surface 26 which is relatively short, while at its tail position T it has a pulley 28 having a reduced diameter and multiple grooves. The remainder of the spindle S is a cylindrical surface 30 of extended length. The two cylindrical surfaces 26 and 30 meet at a shoulder 32 which lies much closer to the nose position N than to the tail position T. The inner race 2 of the bearings B1 at the nose position N fits over the small diameter surface 30 with its back face 12 against the shoulder 32. The inner race 2 of the bearing B2 in the tail position T fits over the small diameter surface 30 near the tail end of the spindle S with its back face 12 presented away from the nose bearing B1. Interference fits exist between the inner races 2 of the two bearings B and the cylindrical surface 30 of the spindle S.

The front faces 14 on the inner races 2 for the two bearings B are presented toward each other and are separated by a spacer sleeve 34 which likewise fits around the spindle S at its small diameter surface 30. Indeed, the ends of the sleeve 34 bear tightly against front faces 14 on the inner races 2 of the two bearings B. Beyond the back face 12 of the tail bearing B2 a clamping ring 36 fits over the cylindrical surface 30, and a end cap 38, in turn, bears against the clamping ring 36. The end cap 38 extends over the end face of the spindle S and also axially along the portion of the cylindrical surface 30 that leads away from the end face. It is secured to the spindle S with machine screws 40 which thread into the spindle S parallel to the axis X. But the end wall of the cap 38 always remains spaced from the end face of the spindle S. When turned down, the machine screws 40, in effect, clamp the inner race 2 of the nose bearing B1 tightly between the shoulder 32 and the separating sleeve 34 and the inner race 2 of the tail bearing B2 tightly between the separating sleeve 34 and the clamping ring 36. This positions the inner races 2 of the two bearings B in fixed axial positions on the spindle S, and of course, the interference fits between the races 2 and cylindrical surface 30 position the races 2 in fixed radial positions. No lost motion exists between the inner races 2 and the spindle S, either radially or axially. In lieu of the end cap 38, a lock nut may be threaded over the end of the spindle S and against the clamping ring 36 to hold the inner races 4, separating ring 34 and clamping ring 36 on the spindle S.

The housing H surrounds the spindle S and contains (FIG. 2) a main bore 48 which opens out of the housing H at the nose position N and a counterbore 50 which opens out of the housing H at the tail position T where it provides a surrounding or backing surface. The bore 48 and counterbore 50 meet at a shoulder 52 which is presented toward the tail position T.

The outer race 4 of the nose bearing B fits into the main bore 48 at the nose position N with an interference fit and with its back face 18 presented toward the tail position T. This leaves the front face 20 of the outer race 4 presented in the opposite direction, yet set inwardly from the nose end of the housing H. Here the front face 20 bears against an end ring 54 which is secured against the end face of the housing H with machine screws 56.

The remainder of the main bore 48 is occupied by a spacer sleeve 60 which fits into the main bore 48 with slightly loose fit. One end of the sleeve 60 bears against the back face 18 of the outer race 4 for the nose bearing B1. The other end of the sleeve 60 lies slightly beyond the shoulder 52 and within the counterbore 50. Here the spacer sleeve 60 is provided with radially directed slits 62 (FIG. 4) which form axially directed fingers 64 at that end of the sleeve 60. The fingers 64, which bear against the back face 18 of the outer race 4 for the tail bearing B2, have the capacity to flex inwardly slightly toward the spacer sleeve 34 that is located around the spindle S.

The tail bearing B2 also lies within the counterbore 50 where it is stabilized by an actuator sleeve 68 (FIG. 3) that fits between the surrounding surface of the counterbore 50 and the outer race 4 of the bearing B2. One end of the actuator sleeve 68 encircles the fingers 64 at the end of the spacer sleeve 60, there being a slight gap between the outside surface of the spacer sleeve 60 at its fingers 64 and the inside surface of the actuator sleeve 68. Here, the very end of the actuator sleeve 68 abuts the shoulder 52. The other end of the sleeve 68 encircles a clamping sleeve 72 which abuts the front face 20 on the outer race 4 of the tail bearing B. Here the clamping sleeve 72 has radial slits 74 (FIG. 5) which create fingers 76 at the end of the sleeve 72. Again a slight gap exists between the outside surface of the clamping sleeve 72 at its fingers 76 and the inside surface of the actuator sleeve 68. The fingers 76 impart a measure of flexibility to the end of the sleeve 72 where the sleeve 72 abuts the outer race 4 of the tail bearing B2. Axially beyond the fingers 76 the clamping sleeve 72 undergoes a reduction in diameter, thus creating a recess 78 at the opposite end of the sleeve 72. That end bears against an end ring 80 which extends across the end face of the housing H at the tail position T, it being secured to the housing H by more machine screws 82 (FIG. 2). The two end rings 54 and 80 are secured with their respective machine screws 56 and 82 such that outer race 4 of the nose bearing B1, the spacer sleeve 60, the outer race 4 of the tail bearing B2 and the clamping sleeve 72 are all clamped together within the bore 48 and counterbore 50 of the housing H and thus cannot undergo any axial displacement with respect to the housing H. As to the outer race 4 of the tail bearing B2, it is confined axially by the spacer sleeve 60 and the clamping sleeve 72, so those sleeves serve as confining sleeves. The end of the counterbore 50 is, for the most part, occupied by a positioning ring 84 which fits into the counterbore 50 with a slightly loose fit. One end of the ring 84 bears against the end of the actuator sleeve 68. At its other end the ring 84 has a rib 86 which is directed radially inwardly into the recess 78 at the end of the clamping sleeve 72. Indeed, the rib 86 is captured in the recess 78, and this prevents displacement of the positioning ring 84 in the counterbore 50. The positioning ring 84 serves two purposes. First, it keeps the clamping sleeve 72 centered around the axis X. In this regard, a close clearance fit exists between the sleeve 72 at its largest diameter and the positioning ring 84, while the gap that exists between the outside surface of the clamping sleeve 72 and the inside surface of the actuator sleeve 68 is slightly larger. Secondly, the positioning ring 84 prevents the actuator sleeve 68 from migrating out of position in the counterbore 50.

Considering the actuator sleeve 68 in more detail (FIG. 3), it lies within the counterbore 50 where it is captured between the shoulder 52 and the positioning ring 84. It has end regions 88 and an intervening region 90 between the two end regions 88. One of the end regions 88 encircles the fingers 64 on the spacer sleeve 60, while the other end region 88 encircles the fingers 76 on the clamping sleeve 72. In these end regions 88, the actuator sleeve 68 is fitted tightly into the counterbore 50, that is to say, a tight interference fit exists between the two end regions 88 of the actuator sleeve 68 and the surrounding surface of the counterbore 50. The intervening region 90 of the actuator sleeve 68 surrounds the outer race 4 of the tail bearing B2 and here an interference fit exists between the region 90 and the outer race 4. Actually, the actuator sleeve 68 is pressed into the counterbore 50 with an interference fit on the order of 0.002 inches between its end regions 88 and the surface of the counterbore 50. At this juncture the inner diameter of the sleeve 68 remains undersized. Then the inside diameter of the sleeve 68 is ground or otherwise machined to provide an interference fit on the order of 0.0005 to 0.002 inches between the sleeve 68 and the outer race 4 of the tail bearing B2. This brings the inside surface of the sleeve 68 nearly flush with the surface of the main bore 48 for the housing H.

While the end regions 88 of the actuator sleeve 68 remain fitted tightly to the surface of the counterbore 50, the intervening region 90, which is the region around the outer race 4 of the bearing B2, is separated slightly for the surface of the counterbore 50, there being for the most part a separation of about 0.001. Actually, the separation amounts to 0.003 inches when the sleeve 68 initially installed in the counterbore 50, but when the outer race 4 of the tail bearing B is fitted to the sleeve 68, the separation decreases to about 0.001 inches. In any event, the separation creates a fluid chamber between the intervening portion 90 of the sleeve 68 and the surrounding surface of the counterbore 50.

At the ends of the intervening region 90, the actuator sleeve 68 has (FIG. 3) two inside grooves 92 which open outwardly toward the surface of the counterbore 50. The grooves 92, while set inwardly from the back face 18 and front face 20 of the outer race 4, nevertheless surround the outer race 4 at the ends of that race. The grooves 92, coupled with the relatively thin cross sections that they create in the sleeve 68, enable the sleeve 68 to flex inwardly in its intervening region 90, while its end regions 88 remain fitted tightly to the surface of the counterbore 50.

In each end region 88, where the sleeve 68 fits tightly against the surface of the counterbore 50 by reason of the interference fit, the sleeve 68 has outside grooves 94, the outer end walls of which extend radially. Each outside groove 94 contains an O-ring 96 and a backing ring 98 behind the O-ring 96, that is between the O-ring 96 and the outer end wall for the groove 94. The O-ring 96 is formed from an elastomeric material of about 90 durometer. It lies slightly compressed between the base of the groove 94 and the surface of the counterbore 50. The backing ring 98 is formed from a more rigid material and bears against the surface of the counterbore 50.

The housing H contains (FIG. 2) a port 100 which leads to the chamber behind the actuator sleeve 68. The port 100 is connected to a source of high pressure hydraulic fluid, and that source may be controlled to vary the pressure of the fluid in the port 100 and in the chamber behind the sleeve 68.

Adjacent to the bearings B the housing H has (FIG. 2) openings 102 which register with more openings 104 in the spacer sleeve 60. The openings 102 receive injectors 106 which project through the openings 104 in the spacer sleeve 60, so that their ends are located opposite the annular spaces between the races 2 and 4 of the two bearings B, that is, the spaces occupied by the balls 6. The injectors 106 have orifices which are directed toward the annular spaces and are connected to a source of lubricant.

The space between the spindle S and the housing H at the nose position N is closed with a nose seal 108 which fits over the large cylindrical surface 28 on the spindle S and into the end ring 54 at the nose end 44 of the housing H. The annular space between spindle S and housing H at the tail position T is closed by another seal 110 which fits over the end cap 48 on the spindle S and into the end ring 80 of the housing H.

The mounting M is assembled with its bearings B set to a condition of end play—typically, on the order of 0.0005 to 0.002 inches—and that setting is most easily controlled at the spacer sleeve 34 that extends over small diameter cylindrical surface 30 on the spindle S. Grinding the sleeve 34 to shorten it reduces the end play in the bearings B. When the spindle S revolves in the housing H, the balls 6 within the bearings B roll along the raceways 10 and 16 of the inner races 2 and outer races 4, respectively. Despite the presence of a lubricant directed into the bearings B by the injectors 106, the bearings B generate heat, particularly at higher speeds. After all, a limited measure of sliding exists between the balls 6 and the raceways 10 and 16 and the lubricant experiences churning. Both generate heat which causes the spindle S to expand both radially and axially more than the housing H, and this of course, disturbs the setting of the bearings B. Usually the radial expansion more than offsets the axially expansion insofar as affecting the setting of the bearings B is concerned, and the bearings B experience a decrease in end play. Also, as the angular velocity of the spindle S increases, centrifugal forces act on the inner races 2 and likewise tend to reduce end play. Even so, end play remains in the bearings B, and in a condition of end play the axis X does not remain fixed with respect to the housing H. This is of course very detrimental to any precision machining operation undertaken with the rotating spindle S.

To bring the bearings B into a condition of preload suitable for sustaining a precision machining operation, the pressure of the hydraulic fluid in the port 100 behind the bearing B2 is increased. Being in communication with the port 100, the narrow space between the two inside grooves 92 on the actuator sleeve 68 sees the increase in pressure as do the two inside grooves 92 themselves. As a consequence, the intervening region 90 of the sleeve 68 flexes inwardly (FIG. 6) and contracts the outer race 4 of the bearing B2. The contraction of the MUD outer race 4 reduces the diameter of the raceways 16 on that race 4 which decreases the internal clearances in both bearings B. This reduces the end play, and if enough pressure is applied, eliminates the end play altogether, bringing the bearings B into preload. Varying the pressure beyond the transformation to preload varies the amount of preload in the bearings B. Of course, when the bearings B are in preload, the axis X remains fixed. The stiffness of the spindle S depends on the magnitude of the preload. The fingers 64 and 76 on the ends of the spacer sleeve 60 and clamping sleeves 72, which axially confine the outer race 4 for the bearing B2, flex inwardly with the outer race 4 as the pressure increases, so when the pressure is released, the outer race 4 will, without delay, expand and revert back to its initial configuration. While the intervening region 90 of the actuator sleeve 68 flexes inwardly with the increase in pressure to contract the outer race 4, the end regions 88, of the sleeve 68, remain against the cylindrical surface of the counterbore 50 with the interference fit intact.

During the operation of the bearing assembly A, that is to say, with its spindle S rotating, the preload in the bearings B is virtually impossible to measure. But certain operating conditions of the bearings B reflect the preload in them. Perhaps temperature reflects the preload best, and it is easily measured with temperature sensors installed in the housing H adjacent to the two bearings B. Another is speed which is easily monitored and measured. Still another is vibration which may be measured with accelerometers or an acoustical microphone. During cutting a more rigid spindle S chatters less than a less rigid one. Yet another is deflection of the spindle S.

Figure 7:
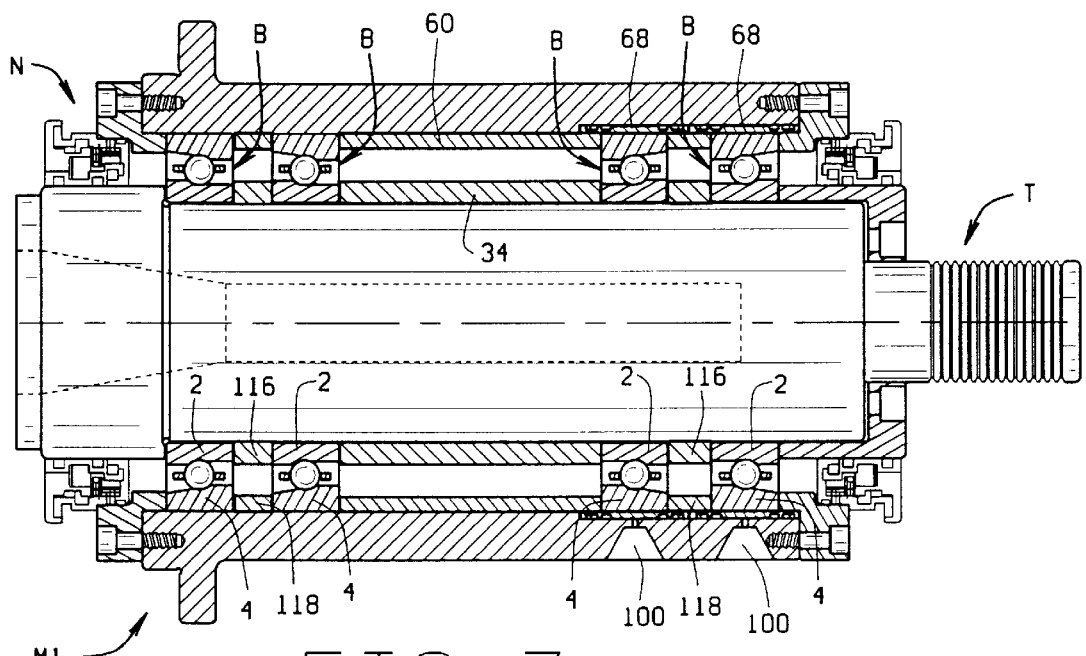
FIG. 7 is a longitudinal sectional view of a modified mounting that uses multiple angular contact ball bearings in the nose and tail positions.

A modified mounting M1 (FIG. 7) is very similar to the mounting A, except that it has multiple bearings B in the nose position N and multiple bearings B in the tail position T, with the inner races 2 of the bearings B in each position being separated by spacers 116 and the outer races 4 likewise being separated by more spacers 118. The spacers 116 and 118 at the nose position N are ground such the bearings B at that position share the radial and thrust loading generally equally. At the tail position T, each of the outer races 4 for the bearings B at that position fits within a separate actuator sleeve 68. The sleeves 68 are actuated individually by fluid supplied through separate ports 100. The spacers 116 and 118 at the tail position T are ground such that the bearings B in the tail position T share the radial and thrust loading generally equally when the pressure around those actuating sleeves 68 is equal. Again sensors monitor the operating conditions of all the bearings B. The pressures behind the actuator sleeves 68 for the two bearings B in the tail position T are controlled independently, so that the preload in each tail bearing B is likewise controlled independently.

Figure 8:
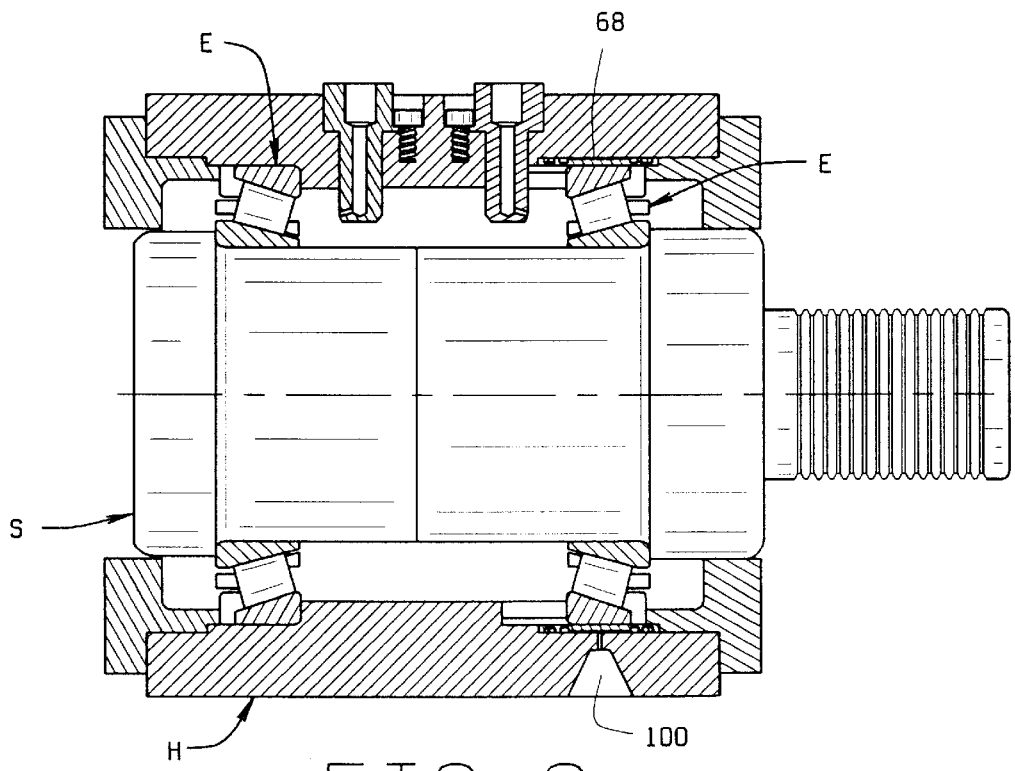
FIG. 8 is a longitudinal sectional view of a modified mounting that utilizes tapered rollers bearings.

The actuator sleeve 68 has utility beyond the angular contact ball bearings B. In this regard, it may be used in another modified mounting M2 (FIG. 8) containing tapered roller bearings E that are mounted in opposition to each other. These bearings also have raceways that are oblique to the axis X and the rolling elements take the form of tapered rollers.

The mounting M, easily lends itself to adaptive control of the machining operation undertaken with the spindle S, and the same holds true for the mountings M1 and M2. In its most basic form adaptive control involves nothing more than monitoring the temperature of the two bearings B and perhaps the speed of the spindle S as well and varying the setting for the bearings B to maintain a generally constant temperature. In this regard, when the bearings B are in preload, an increase in pressure behind the actuator sleeve 68 will increase the preload and cause the bearings B to run at a higher temperature. A change in setting does not produce an immediate change in temperature, so temperature readings must be spaced sufficiently in time from changes in the setting to enable the temperature of the mount M to stabilize. The speed at which the spindle S turns may be used to predict temperature at which the bearings B operate and can be used to anticipate temperature changes and accommodate them with appropriate pressure changes.

Figure 9:
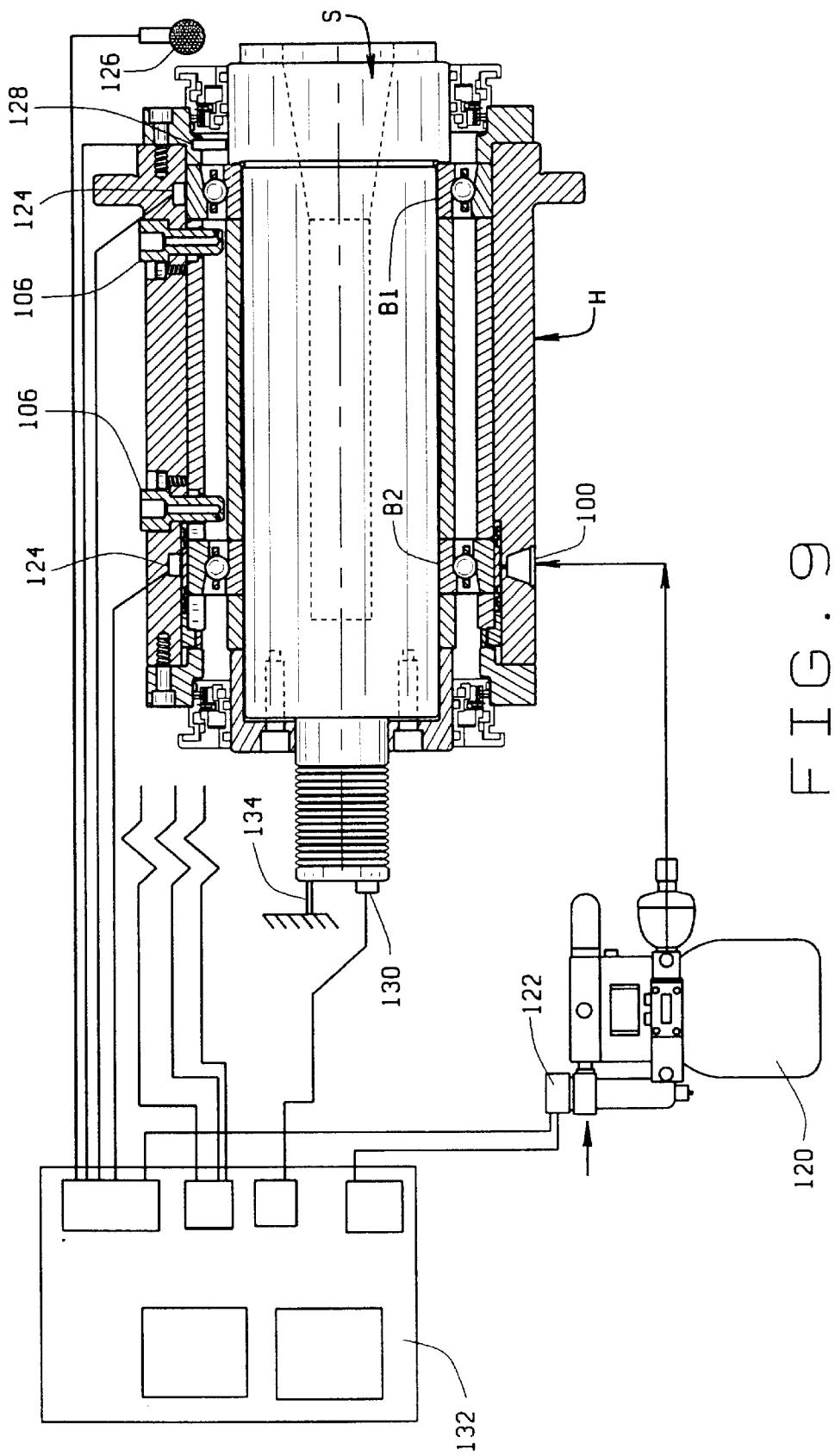
FIG. 9 is a schematic view showing an adaptive control system for selecting the settings and other conditions under which the bearings operate.

In a more sophisticated system of adaptive control (FIG. 9) additional operating conditions are monitored and control is exercised over additional conditions that affect the operation of the spindle S. The more sophisticated system of course controls the pressure of the hydraulic fluid at the port 100 and within the chamber behind the actuator sleeve 68. To this end, the hydraulic fluid is pressurized with an air-to-hydraulic booster 120 having an electronically controlled air regulator 122. The booster 120 may have a 60:1 ratio. The housing H behind the outer race 4 of each bearing B is fitted with a thermocouple 124. At its nose position N, the housing H is further provided with an accoustical microphone 126 that has the capacity to detect chatter or self-excited vibrations in the spindle S. In addition, at its nose position N the housing H has two displacement probes 128 located 90° apart, and these are arranged to measure radial movements of the spindle S. Finally, the housing H is fitted with a speed sensor 130 which monitors the angular velocity of the spindle S. The thermocouple 124, microphone 126, displacement probes 128 and speed sensor 130 generate signals that reflect the conditions which they monitor, and those signals are directed to a controller 132 that contains a microprocessor and memory.

Not only does the controller 132 operate the air regulator 122 on the air-to-hydraulic booster 120, but it also controls the amount of lubricating oil that is directed into the bearings B by the injectors 106 and the time when the oil is dispensed and also the flow of a coolant around the housing H.

In a typical operating cycle, the displacement probes 128, when the spindle S is initially set into operation, will detect radial displacement of the nose end of the spindle S owing to the end play under which the bearings B operate at that time. Once the bearings B enter preload, the probes 128 combine to monitor movement of the spindle S, and this is usefull in determining if the spindle S has the proper preload. If too much movement exists, the controller 132 detects it and increases the pressure behind the actuator sleeve 68 to increase the preload in the bearings B.

The thermocouples 124 monitor the temperature of the bearings B, and the controller 132 in response to the temperatures sensed by the thermocouples 124 changes the pressure behind the actuator sleeve 68. Lowering the pressure will decrease the preload and lessen the temperature and vice versa. Also, the controller 132 may energize the injectors 106, causing them to inject more lubricant into the bearings B, and that will change the operating temperatures of the bearings B. Similarly, if the temperature of the bearings B becomes excessive, the controller 132 may direct cooling fluid to the housing H.

If the accoustical microphone 126 detects chatter, the controller 132 will change the preload in the bearings B. This has the effect of changing the resonant frequency of the spindle S which should eliminate the chatter.

Since the controller 132 collects data at different operating conditions, and stores that data, it can determine in advance the temperature a particular pressure setting and speed is likely to yield. If the speed of the spindle S is increased to that particular setting, the temperature of the bearings B will of course increase and that will increase the preload in the bearings B. But the controller 132 has stored within its memory the condition that is likely to occur and can reduce the pressure behind the actuator sleeve 68 and the preload in the bearings B before the condition develops.

The concept of adaptive control may be extended to controlling the axial position of the spindle S. This requires another actuator sleeve 68 around the bearing B1 in the nose position N in addition to the sleeve 68 at the bearing B2 in the tail position T. It also requires an axial displacement sensor 134 somewhere along the spindle S, such as at the end face in the tail position T, to monitor the axial position of the spindle S with respect to the housing H. In order to displace the spindle S axially—although ever so slightly—in the housing H, the pressure behind the two actuator sleeves 68 are manipulated, generally such that the pressure behind the one sleeve 68 is increased and the presence behind the other sleeve 68 is decreased. For example, to project the spindle S further from the nose end of the housing H, the pressure behind the sleeve 68 for the bearing B2 in the tail position T is decreased, while the pressure behind the sleeve 68 for the bearing B1 in the nose position N is increased. Nevertheless, the pressure at both locations remains great enough to sustain stiffness and other characteristics desired. Of course, to retract the spindle S further into the nose end of the housing H, the pressure behind the bearing B1 is decreased and the pressure behind the bearing B2 is increased. The axial displacement probe 134 produces signals that reflect the axial position of the spindle S, and the controller 132 reacts to those signals to maintain the spindle S in the desired axial position.

While the mountings M, M1 and M2 have primary utility in machine tools, they have applications elsewhere as well—generally, wherever one member rotates with respect to another member on bearings that will experience a change in setting with a change in temperature, load, or some other factor. And the setting controlled may be preload, end play, or both. The bearings need not even carry thrust loads, inasmuch as the actuator sleeve 68 can control the setting in a cylindrical roller bearing or a purely radial ball bearing, in which event the setting controlled is in effect the internal clearance in the bearing. The actuator sleeve 68 need not be confined to an outer race. On the contrary, it may be installed within an inner race to expand that race and thereby vary preload.

What is claimed is:

1. An assembly comprising: a housing containing a fluid port; a spindle located within the housing; at least two bearings located between the housing and the spindle to enable the spindle to rotate within the housing about an axis, each bearing including an inner raceway carried by the spindle and an outer raceway carried by the housing and rolling elements located in a row between the inner and outer raceways, the raceways of each bearing being oblique to the axis so that the bearing will transmit radial loading and also thrust loading in the axial direction which seats the rolling elements against the raceways, the two bearings being mounted in opposition so that one takes thrust loading in one axial direction and the other takes thrust loading in the other axial direction, the outer raceway for one of the bearings being on a race that is located within the housing and has end faces; and an actuator sleeve located in the housing and fitted around the race, the actuator sleeve being flexible and having end regions where it is sealed against the housing and, between the end regions, having an intervening region which together with the housing creates a chamber that communicates with the port of the housing, whereby the actuator sleeve will flex with changes in pressure in the chamber and will change the configuration of the bearing race and the outer raceway on it, thus changing a condition of the bearings.

2. An assembly according to claim 1 wherein the actuator sleeve is sealed to the housing beyond the end faces of the bearing race; wherein the intervening region of the sleeve surrounds the race; and wherein the sleeve flexes in its intervening region.

3. An assembly according to claim 2 wherein the sleeve has inside grooves at the ends of its intervening region.

4. An assembly according to claim 3 wherein the inside grooves in the actuator sleeve open toward the housing and form part of the chamber that exists between the sleeve and the housing.

5. An assembly according to claim 4 wherein the housing has a surrounding surface against which the actuator sleeve is sealed and an interference fit exists between the end regions of the sleeve and the surrounding surface of the housing, even when the chamber is pressurized.

6. An assembly according to claim 5 wherein an interference fit exists between the intervening region of the actuator sleeve and the outer race of the bearing, even when the chamber is not pressurized.

7. An assembly according to claim 6 wherein the grooves in the actuator sleeve are located generally inwardly from the end faces of the bearing race.

8. An assembly according to claim 7 wherein the end regions of the actuator sleeve have outside grooves which open toward the surrounding surface of the housing, and the outside grooves contain elastomeric seals which are compressed against the surrounding surface of the housing.

9. An assembly according to claim 1 and further comprising confining sleeves located within the housing with the bearing race being between and confined axially by the confining sleeves, the ends of the confining sleeves being clamped against the end faces of the bearing race, the confining sleeves at their ends where they bear against the race having fingers which flex and accommodate radial expansion and contraction of the race.

10. An assembly according to claim 1 wherein the actuator sleeve contains grooves which are located around the race generally axially inwardly from the end faces of the race and open outwardly away from the axis, all to facilitate flexure of the actuator sleeve.

11. An assembly according to claim 10 wherein the actuator sleeve contains additional grooves which are located axially beyond the end faces of the race and likewise open outwardly away from the axis; and wherein the additional grooves contain elastomeric seal rings.

12. An assembly according to claim 1 and further comprising: confining sleeves located within the housing, there being one confining sleeve beyond each end face of the race, the race being confined axially in the housing by the confining sleeves, the confining sleeves having fingers which project axially and bear against the end faces in the race, the fingers having the capacity to flex to accommodate expansion and contraction of the race.

13. An assembly comprising: a first member; a second member rotatable relative to the first member about an axis and having a circular surface; a bearing located between the first and second members and including a raceway carried by the first member in a fixed position relative to the first member; a race carried by the second member and having end faces and also a raceway presented toward the raceway on the first member, and rolling elements located between the raceway on the first member and the raceway on the race that is carried by the second member; and an actuator sleeve carried by the second member along the circular surface and behind the race on the second member, the sleeve having its ends fixed in position on the second member, with the ends being located beyond the end faces of the bearing race, the sleeve near its ends being sealed against circular surface, but being flexible intermediate its ends, the sleeve having inside grooves located near the end faces of the bearing race to render the sleeve more flexible near the ends of the race, the sleeve together with the second member forming a chamber behind the sleeve for receiving a pressurizing fluid, whereby when the pressure in the chamber is elevated, the configuration of the race and its raceway changes, so that the setting of the bearing may be controlled by varying the pressure within the chamber.

14. An assembly according to claim 13 wherein the actuator sleeve in its ends has outside grooves that open away from the axis; and wherein the outside grooves contain elastomeric seal rings.

15. An assembly according to claim 13 and further comprising: confining sleeves located within the housing, there being one confining sleeve beyond each end face of the race, the race being confined axially in the housing by the confining sleeves, the confining sleeves having fingers which project axially and bear against the end faces on the race, the fingers having the capacity to flex to accommodate expansion and contraction of the race.

16. An assembly comprising: a first member; a second member rotatable relative to the first member about an axis and having a circular surface; a bearing located between the first and second members and including a raceway carried by the first member in a fixed position relative to the first member; a race carried by the second member and having end faces and also a raceway presented toward the raceway on the first member, and rolling elements located between the raceway on the first member and the raceway on the race that is carried by the second member; an actuator sleeve carried by the second member along the circular surface and behind the race on the second member, the sleeve having its ends fixed in position on the second member, with the ends being located beyond the end faces of the bearing race, the sleeve near its ends being sealed against the circular surface, but being flexible intermediate its ends, the actuator sleeve together with the second member forming a chamber behind the sleeve for receiving a pressurizing fluid; and confining sleeves fixed in position on the second member and at their ends being tightly against the end faces of the bearing race, the confining sleeves where they are against the end faces of the bearing race having fingers which flex to accommodate contraction and expansion of the race; whereby when the pressure in the chamber behind the race is elevated, the configuration of the race and its raceway changes; so that the setting of the bearing may be controlled by varying the pressure within the chamber.

* * * * *